July 14, 1931. W. E. TRENT 1,814,461
PROCESS OF PRODUCING METALS FROM THEIR OXIDE ORES
Filed Feb. 28, 1928 6 Sheets-Sheet 4
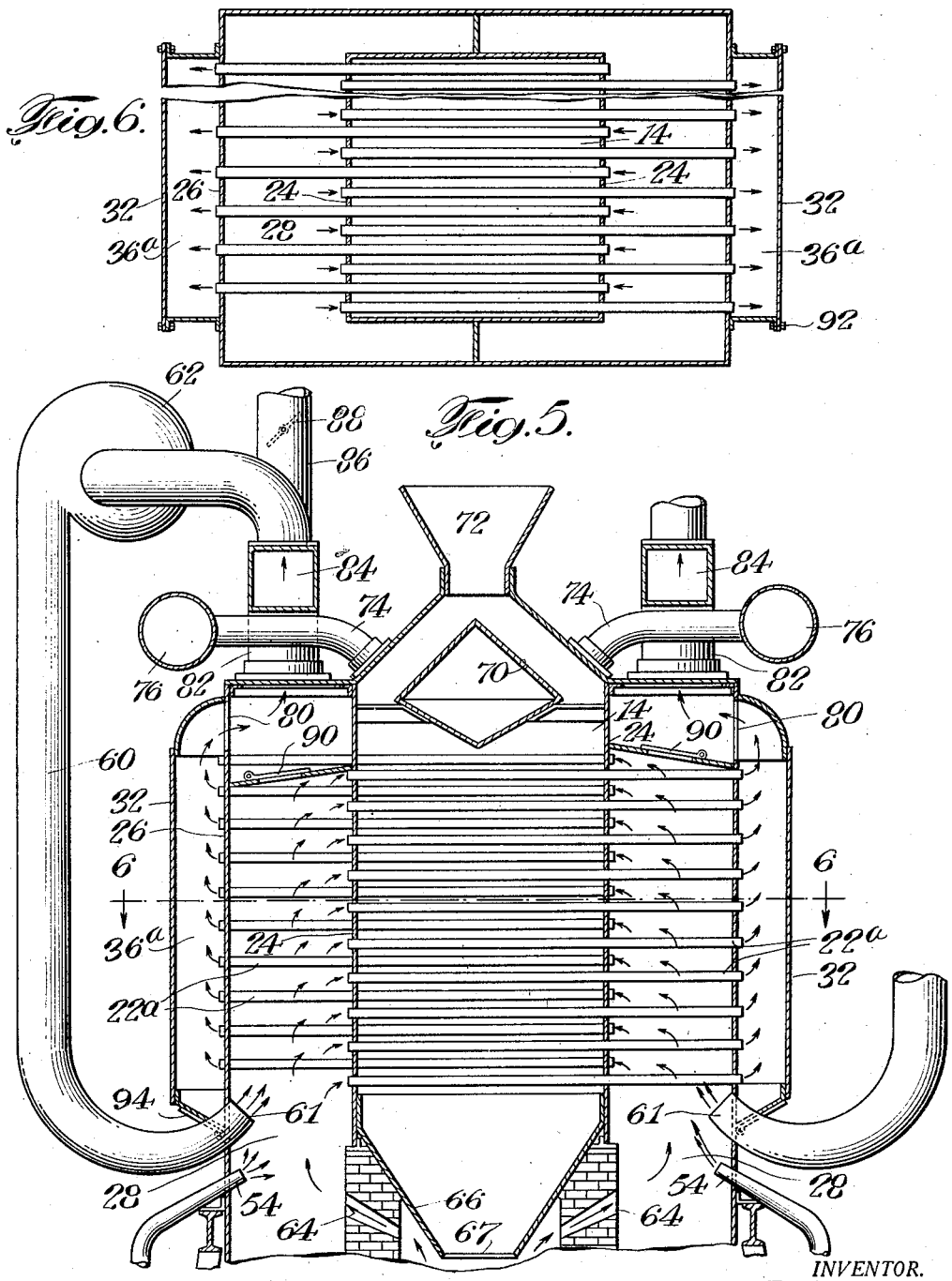
INVENTOR.
Walter E. Trent
BY
ATTORNEYS.

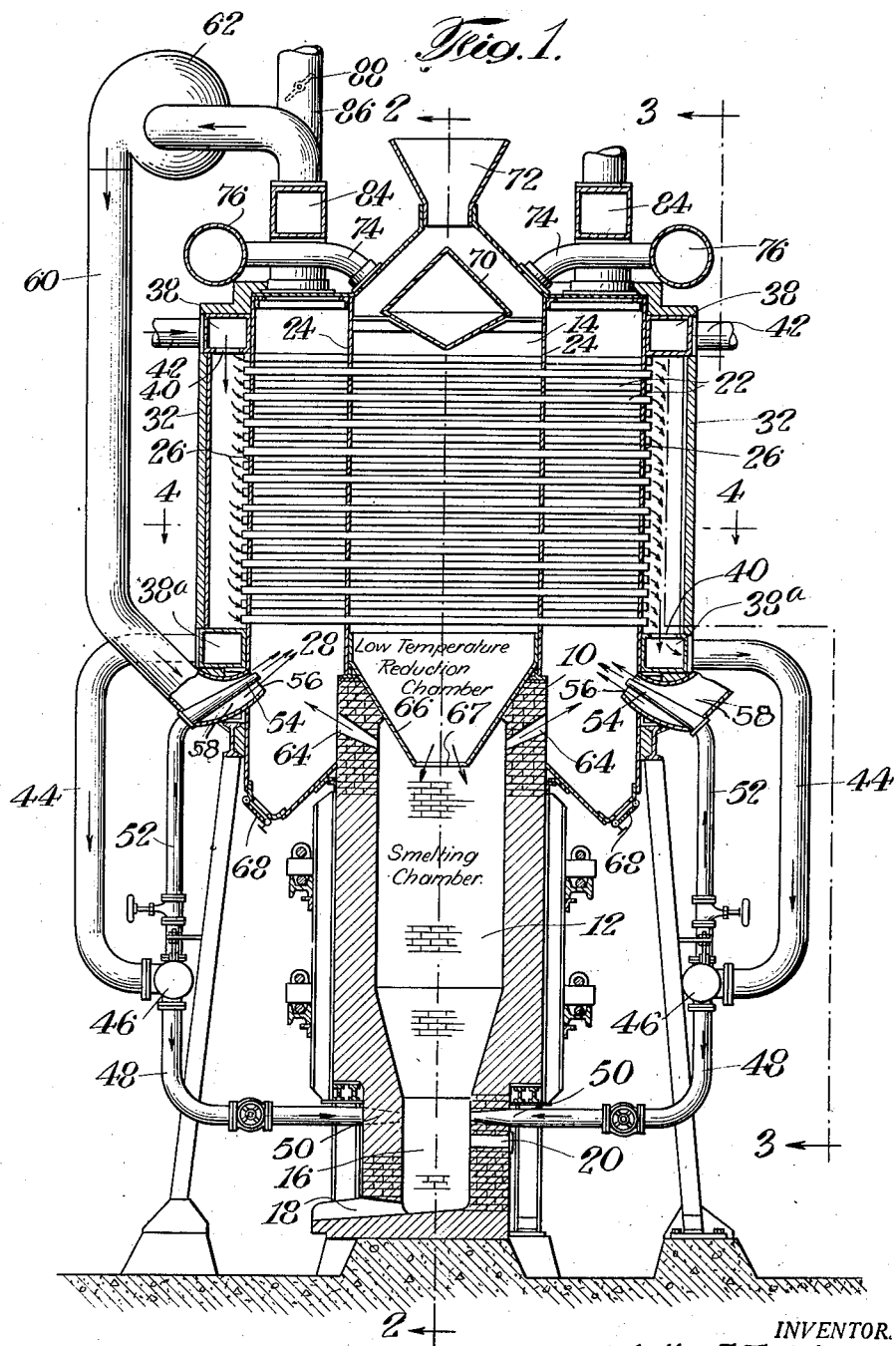

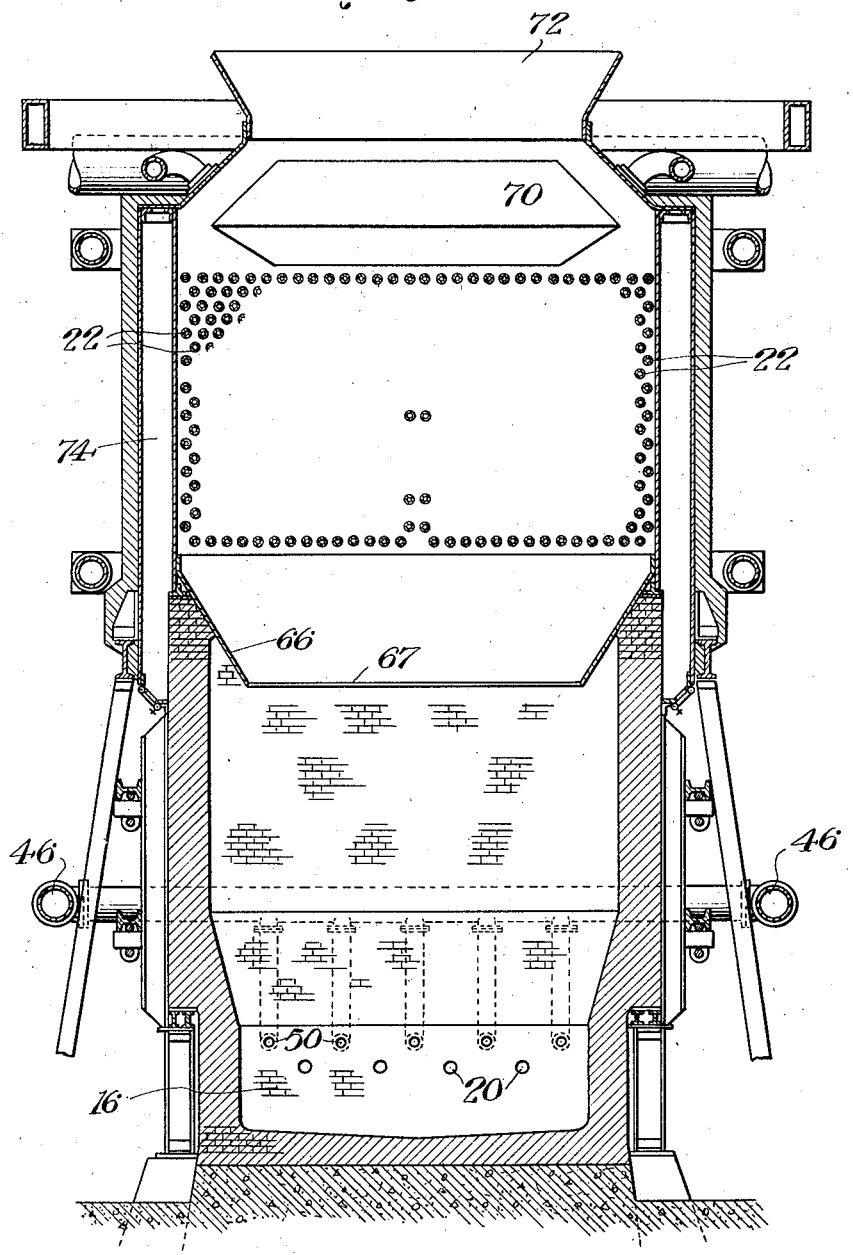

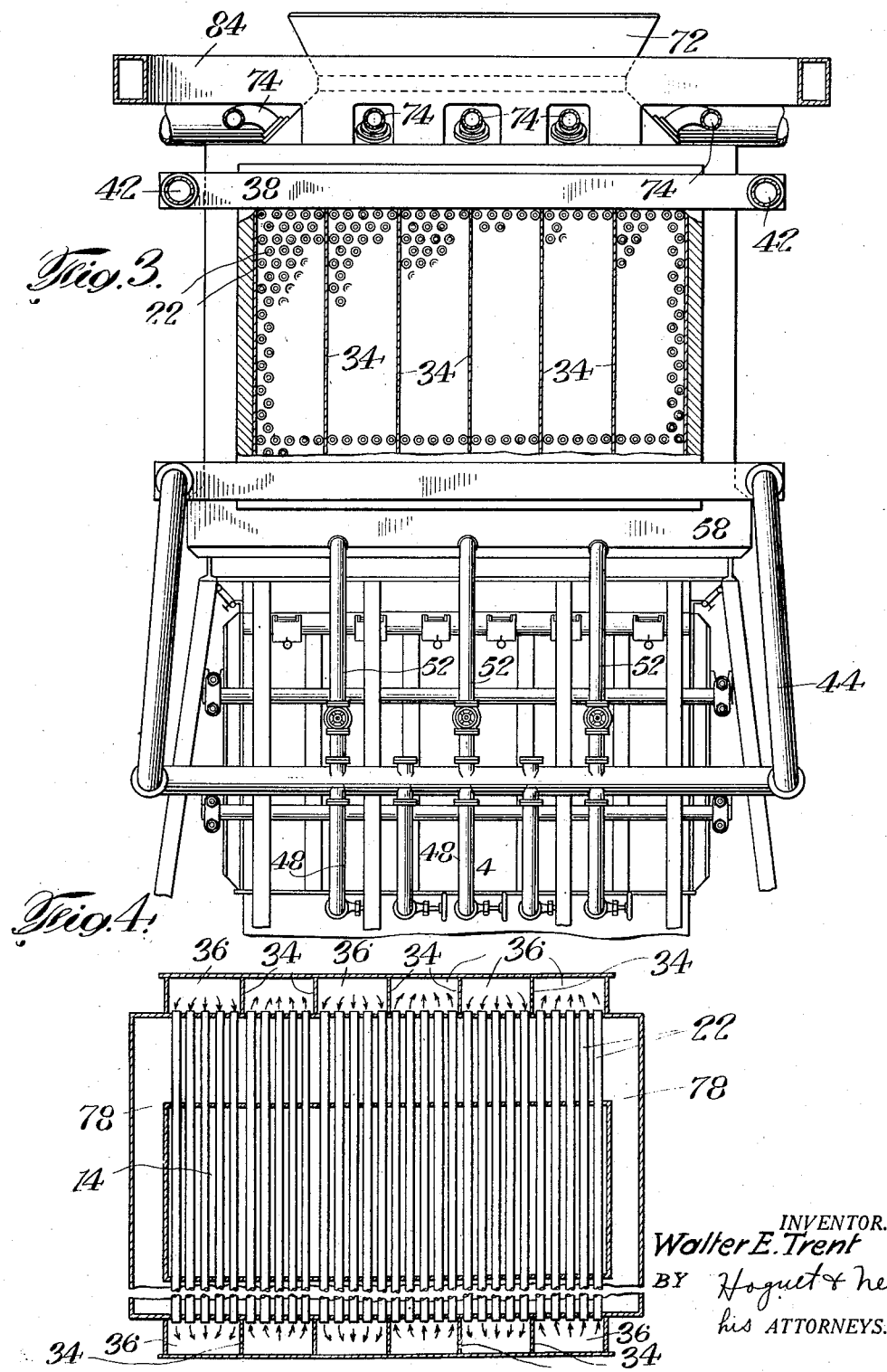

July 14, 1931.    W. E. TRENT    1,814,461
PROCESS OF PRODUCING METALS FROM THEIR OXIDE ORES
Filed Feb. 28, 1928    6 Sheets-Sheet 5

Fig. 7.

INVENTOR.
Walter E. Trent.
BY Hoguet & Neary
ATTORNEYS.

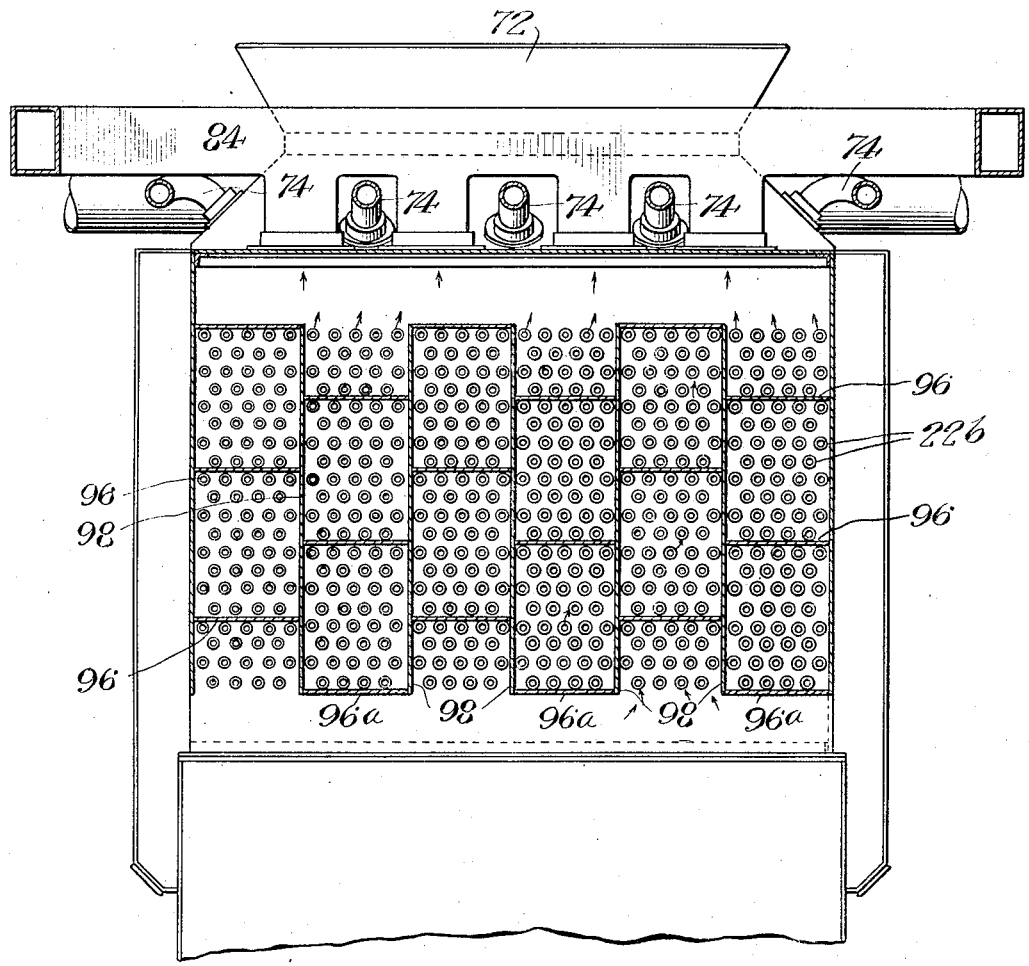

Patented July 14, 1931

1,814,461

UNITED STATES PATENT OFFICE

WALTER E. TRENT, OF NEW YORK, N. Y., ASSIGNOR TO THE TRENT PROCESS CORPORATION, A CORPORATION OF DELAWARE

PROCESS OF PRODUCING METALS FROM THEIR OXIDE ORES

Application filed February 28, 1928. Serial No. 257,686.

The invention relates to a process of reducing oxide ores, and in particular, to the reduction of oxide ores of iron and the production of pig iron therefrom as a continuous process.

The invention contemplates in its broader aspects the indirect heating of a mixture of ore and coal to at least partially reduce the ore and to substantially completely devolatilize the coal and then subjecting the residue to a heated air blast to burn the carbonized coal particles therein and convert the reduced metal to a fluid state.

Other features of the invention include the withdrawal of gases evolved in the smelting zone at a point intermediate the smelting and reducing zones and burning the same with air to supply heat indirectly to the ore-coal mixture in the reducing zone and also, and preferably simultaneously, to preheat the air used in supporting combustion in the smelting zone. The recirculation of spent combustion gases for the purpose of controlling the temperature in the reducing zone is also contemplated.

The invention has for a principal object the simultaneous reduction of ore and the carbonization of coal for smelting the same under such conditions that valuable distillation products of the coal are recovered substantially without admixture with the diluent gases, such as carbon dioxide and nitrogen, that constitute a large proportion of the gases obtained in following the usual blast furnace practice.

Another object of the invention is to conduct the reducing and smelting operations as a continuous process but under such conditions that the reduction of the ore and the smelting of the reduced metal is carried on in substantially distinct zones, the gaseous products evolved in the smelting zone being utilized to supply heat indirectly to the ore in the reducing zone.

Still another object of the invention is to utilize the hot gases issuing from the smelting zone and the heat values therein in heating ore supplied to the reducing zone.

Other objects and advantages of the invention will appear as the description proceeds.

In the preparation of iron and similar metals from their oxide ores according to the usual blast furnace practice, it is necessary to use rather elaborate and expensive equipment. The coke is made by distilling raw coal in by-product ovens, which are not only relatively expensive to install but require specific coking types of coals, or mixtures of coking coals, which are not available at all locations which may be served with cheap iron ores. In such operations, even when coking coals and cheap iron ores are available, it is necessary that the coke be quenched and cooled resulting in considerable heat loss before same is transported and charged into the blast furnace.

In the present invention, the raw coal is introduced into the furnace and during the continuous process is first transformed to coke particles and continues through to complete gasification and combustion of the coke.

The invention contemplates the use of both coking and non-coking coals as both are applicable to this process. It is desirable to crush strongly coking coals to rather small sizes, say one-eighth mesh and smaller, and mix same thoroughly with the iron oxides and flux so that no large agglomerations of coke will occur to impede travel of the charge while travelling downwardly around heated tubes in a reducing chamber.

According to a preferred form of the invention, crushed ore and finely crushed coal are introduced to a suitable chamber and heated by indirect heat to about 1000° F. or less. A preferred form is to heat tubes or hollow rods that extend through walls into the retort chamber, letting the heat be conducted through the rods into the heating chamber. These rods are preferably hollow to permit the passage of air therethrough. The air so conducted becomes preheated and is later used for both primary and secondary combustion. Another form of indirect heating which may be employed is to have high temperature tubes, through which the products of combustion of the blast furnace gases and air, plus recirculated gases to control temperatures, used instead of the rods. In this case the products of combustion pass through the tubes and heat same, more or less after the manner of raising steam in boilers. When such tubes are used the air for combustion is either used without preheating, or heated in some acceptable form of external air heating device. As the charge passes downwardly through the reducing zone about the high temperature tubes, it is heated, and, therefore, the coal is distilled and the resulting coked particles react with the oxygen of the air to bring about reduction at temperatures below that at which agglomerating, sintering, or fusing, takes place. The reduced ore, flux and residual fuel is passed continuously from this chamber into a second chamber that is directly heated by means of combustion of fuel constituents of the charge and air preheated as aforesaid, thereby causing the formation of molten slags and metals and combustible gases which latter are led off from the second or smelting chamber and burned to supply heat indirectly to the charge in the first or reducing chamber.

While my process may be carried out with apparatus of various types it is preferably performed in a furnace of improved construction. Accordingly, in the detailed description reference will be made thereto and for that reason attention is directed to the accompanying drawings in which:

Fig. 1 is a vertical sectional view of a furnace and associated air heating equipment which may be used in carrying out the present invention;

Fig. 2 is a vertical sectional view taken on the line 2—2 of Fig. 1;

Fig. 3 is a part side elevation and part section taken on the line 3—3 of Fig. 1;

Fig. 4 is a horizontal sectional view through the air preheating and reducing section of the furnace taken on the line 4—4 of Fig. 1;

Fig. 5 is a vertical section of the upper portion of the furnace showing a modified form of heating means for the reducing chamber;

Fig. 6 is a horizontal sectional view taken on the line 6—6 of Fig. 5;

Fig. 7 is a vertical section of the upper portion of the furnace showing still another modification of means for supplying heat to the reducing chamber; and Fig. 8 is a vertical section taken on the line 8—8 of Fig. 7.

Referring to the drawings, 10 is a shaft furnace of rectangular cross-section comprising a lower smelting chamber 12, formed of the usual refractory brick work, and an upper low temperature reducing chamber 14 which may be constructed of metal. The smelting chamber is provided at its lower end with the usual hearth or collecting basin 16 and the usual tap holes 18 and 20 for the metal and slag, respectively. Mounted in the side walls 24 of the reducing chamber and extending across the same are a plurality of tubes 22 for the passage of air. The tubes 22 extend through the side walls and are mounted at their ends in walls 26 parallel to and spaced from the side walls 24 and defining combined combustion chambers and passages 28 therebetween. These tubes are preferably provided with relatively thick walls to facilitate the absorption of heat by the tubes and conduction thereof to the reducing chamber.

Disposed in parallel relation to, and spaced from the walls 26 are walls 32. The space defined between each pair of walls 26 and 32 is divided by vertical partitions 34 into a plurality of chambers 36, six being shown by way of example. These chambers communicate with the tubes 22 and alternately communicate with headers 38 and 38a at the top and bottom, respectively, by means of the openings 40. In other words, three alternate chambers 36 on one side of the furnace communicate with the adjacent header 38 and the other three chambers communicate with the adjacent header 38a. It will also be noted that the chambers 36 on the one side of the furnace that are respectively disposed opposite those alternate chambers on the opposite side communicating with the header 38a for example, communicate in their turn with the adjacent header 38. By this arrangement air introduced into the inlets 42 from a suitable blowing engine is caused to pass through certain sections of the bank of tubes 32 from left to right as indicated by the arrows in Fig. 1, and through alternate sections from right to left. Communicating with the headers 38a are pipes 44 leading to a bustle pipe 46 from which pipes 48 lead to tuyères 50. Other pipes 52 lead upwardly from the bustle pipe 46 and discharge through nozzles 54 into the lower portion of each of the combustion chambers 28. The nozzles 54 are shown in Fig. 1 as concentrically disposed in discharge outlets 56 from ducts 58 but may discharge separately therefrom. Communicating with the respective ducts 58 are pipes 60 each connected at its opposite end to the upper end of an adjacent combustion chamber and passage 28. A blower 62 is disposed in each pipe 60 for causing return of the relatively cool gases and spent products of combustion to the lower portion of the combustion chamber 28 to control the temperature of the combustion products passed upward over the ends of the tubes 22 therein.

Leading from the upper end of the smelting chamber are outlet passages 64 for the gases evolved during the smelting of the ore. In order to facilitate the discharge of these gases through the passages 64 and assist in preventing their passage upward into the charge in the reducing chamber, a hopperlike member 66 is provided in the lower end of the reducing chamber. This member 66 is provided with a central opening 67 for discharge of the reduced ore and residual fuel from the reducing chamber into the smelting chamber. The downwardly extending portions of the member 66 serve to deflect gases evolved in the smelting chamber upward into the outlet passages 64. As shown, the outlet passages 64 discharge into the lower portion of each of the combustion chambers 28 adjacent the point of discharge of the air inlet nozzles 54. The gases issuing from the smelting zone are relatively rich in combustible constituents and upon mixing with the air introduced through the nozzles 54 they burn, thus supplying heat to the tubes 22 in their passage thereover through the chambers 28. Doors 68 for cleaning and removal of ash, slag or any ore particles that may collect in the bottom of the combustion chambers 28 are provided.

The usual bell 70 and hopper 72 are provided at the top of the reducing chamber, and any suitable means, not shown, for opening and closing the same may be provided. The upper end of the reducing chamber 14 is in communication with pipes 74 leading to gas offtake mains 76 for leading the products of the coal distillation and the reduction of the ore to a gas holder or other means of storage or use.

According to the modification shown in Figs. 5 and 6, instead of using the relatively thick walled tubes 22 and providing connections for the passage of air therethrough, I provide tubes 22a disposed across the reducing chamber in the same manner as the tubes 22 shown in Figs. 1-4, inclusive, but arranged in two sets, the tubes in one set each having one end terminating at the wall 24 at the left hand side of the reducing chamber as viewed in Fig. 5 and its other end extending across the combustion chamber 28 adjacent the opposite wall 24 and terminating in the wall 26 separating the adjacent combustion chamber 28 from a passage or flue 36a formed between the wall 26 and the wall 32; the tubes in the second set extend from the wall 24 on the right hand side of the reducing chamber through such chamber and across the combustion chamber 28 on the left hand side of the furnace. It will be seen that in this way communication is established through the first set of tubes between the combustion chamber 28 on the left side of the reducing chamber and the flue 36a on the right side, and vice versa, that communication will be established through the second set of tubes between the combustion chamber 28 on the right side and the flue 36a on the left side of the reducing chamber. The flues 36a communicate through openings 80 and passages 82 with headers 84 from which connections lead to blowers 62 and to stack flues 86. In addition to the control of recirculation of the combustion gases which is afforded by the blowers 62, dampers 88 may be inserted in the stack flues 86. In order to further control the transmission of heat to the charge in the reducing chamber, by-pass dampers 90 are provided at the upper ends of the respective combustion chambers 28 to permit part of the combustion products to be diverted directly through the passages 82 and the headers 84 to the stack flue 86. As shown at 92 in Fig. 6, the wall members 32 are removable to permit cleaning of the tubes 22a. Clean out doors 94 are also provided in the lower portions of the flues 36a for the removal of soot and ash deposits therefrom.

According to the modification shown in Figs. 7 and 8, tubes 22b, similar to those shown in Figs. 5 and 6 but only extending across the reducing chamber 14 are provided. Horizontal baffles 96 are disposed in spaces above the respective combustion chambers 28 between the walls 24 and 26, and in order to produce circulation of the combustion gases from both combustion chambers simultaneously back and forth through successive sections of the bank of tubes in the reducing chamber, vertical partitions 98 are also provided for dividing such spaces into a plurality of vertical sections, six being shown in the drawing, three being adapted to receive gases from the combustion chamber 28 on one side of the furnace and three being adapted to receive gases from the similar combustion chamber on the opposite side of the furnace. As shown in the drawing, the baffles 96 in a given vertical section on one side of the furnace are offset respecting the baffles in the opposing section on the opposite side of the furnace. Alternate vertical sections are also closed off from the adjacent combustion chamber 28 by a horizontal partition wall 96a.

The hot gases produced in the chambers 28 from the combustion of the gases issuing from the smelting zone through the openings 64 and mingling with air, either cold or preheated by any suitable preheating means, issuing from the air blast nozzles 54, are led from the space 28a into the lowermost tubes communicating therewith and then out into the oppositely disposed chamber 28b. From the chamber 28b the gases are led back through the next higher section of tubes into the chamber 28c, thence through the next higher series of tubes to the chamber 28d, thence back through a still higher series to the chamber 28e and finally through the uppermost series to the chamber 28f, from which latter they are withdrawn through the passages 82 to the adjacent header 84 and then led either to the stack flue 86 or in part returned through the blower connection and the pipe 60 and discharged into the combustion chamber 28 through the nozzles 61 and caused to recirculate with the combustion gases formed therein and to control the temperature of such gases. With the construction shown, it will be obvious that the transmission of heat from the combustion gases to the ore-coal charge is brought about according to true countercurrent principles, the ore-coal charge being subjected to heat from the relatively cold gases which have given up the greater portion of their sensible heat to the tubes in the lower portion of the reducing chamber, and as the ore-coal charge travels downwardly through the chamber it passes through successively hotter and hotter zones.

In order to afford means for controlling the transmission of heat to the tubes 22b in addition to the means for recirculating the relatively cool combustion gases in the provided by-pass chambers 100 adapted to divert gases from the chambers 28a and 28c to flues 36b and thence through openings 80a to the headers 84.

In carrying out my process in the apparatus shown, the furnace is first blown in in the usual manner by igniting a charge of coke, dry wood or other carbonaceous combustible material in the smelting chamber and then crushed ore (if iron ore, hematite, magnetite or other oxide ore may be used), flux and coal are introduced through the charging hopper 72. The charge, as it is fed downwardly through the reducing chamber, is heated indirectly through the walls 24 and by means of heat conducted along the tubes 22 from the combustion chambers 28, or by heat from the combustion gases passing through the tubes 22a or 22b in case the modified forms of apparatus shown in either Figs. 5 and 6 or Figs. 7 and 8 are employed. Passages 78 are also shown in Figs. 2 and 4 for conducting gases from the combustion chambers 28 around the ends of the reducing chamber to supply heat thereto and also insulate the ends of the reducing chamber from the air. The temperatures in the reducing chamber are at all times maintained below that which will cause agglomeration or sintering of the charge and preferably the temperature of the charge is raised gradually and slowly at such a rate as will insure devolatilization of the coal before its normal fusion temperature is reached. As a general rule, the temperature in the reducing chamber should not, even in the lower and hotter portion exceed 1000° F. The temperature of the charge may be kept within the desired limits by controlling the amount of relatively cool gases recirculated through the pipes 60 and mixed with the combustion products resulting from the burning of the air and combustible gases admitted through the nozzles 54 and the passages 64, respectively.

It is not essential that the ore be completely reduced to a state of metallic sponge by the time it has reached the discharge opening 67, since any unreduced ore will be acted upon in the smelting chamber by the excess carbon present. The amount of coal or other fuel introduced with the ore should always be such that a substantial excess over that necessary to reduce the ore and furnish fuel for heating in the smelting zone is provided, in order that carburization of the sponge and the easy melting thereof in the smelting zone may be made possible. Preferably the carbon content of the charge is so regulated that a product having substantially the composition of ordinary pig iron is obtained.

By withdrawing the gases evolved in the smelting zone at a point intermediate the smelting and reducing zones, the distance the air blast introduced at the tuyères has to travel through the charge is materially decreased, thus making it possible to operate with materially less pressure on the blast and consequent economy in blowing equipment and power for operating the same. Also, owing to the fact that diluent gases, such as nitrogen introduced with the blast and carbon dioxide resulting from complete combustion of part of the fuel in the smelting zone, are by-passed around the reducing chamber, the gaseous products which discharge from the reducing chamber will be of high fuel value. Any oil vapors resulting from the coal distillation may also be separated and recovered from the gaseous constituents with much greater facility than would be the case if such separation of the reducing and smelting zones were not maintained.

As a fuel either coking or non-coking coals may be used; also certain of the benefits of the present invention may be obtained by the use of coke or carbonized coal particles instead of untreated coal, particularly with respect to the improvement in the heating of the air and the reduction of the pressure required to force the air blast through the charge. Accordingly, it is to be understood that the invention in its broader aspects involves the use of any solid carbonaceous material as a reducing agent and fuel.

What I claim is:

1. A process of reducing oxide ores which comprises indirectly heating a mixture of ore, fuel and flux to a temperature sufficient to initiate reduction of the ore by carbon but below an agglomerating or sintering temperature; continuing the heating until substantial reduction is brought about; then introducing the reduced charge to an adjacent and independent smelting zone and heating directly by combustion of carbon therein; withdrawing the gaseous products from the smelting zone and utilizing them in indirectly heating a fresh charge in the reducing zone.

2. A process of reducing oxide ores which comprises indirectly heating a mixture of ore, fuel and flux to a temperature sufficient to initiate reduction of the ore by carbon but below an agglomerating or sintering temperature; continuing the heating until substantial reduction is brought about; then introducing the reduced charge to an independent smelting zone while in a heated condition and heating the reduced charge in the smelting zone directly by combustion of carbon therein; withdrawing the gaseous products from the smelting zone and burning them with air to indirectly heat a fresh charge in the reducing zone.

3. A process of reducing oxide ores which comprises indirectly heating a mixture of ore, fuel and flux to a temperature sufficient to initiate reduction of the ore by carbon but below an agglomerating or sintering temperature; continuing the heating until substantial reduction is brought about; in continuously introducing the reduced charge to an independent smelting zone before any substantial drop in the temperature occurs; and heating directly by combustion of carbon therein; withdrawing the gaseous products from the smelting zone, burning them with air to indirectly heat a fresh charge of ore in the reducing zone and controlling transfer of heat from the combustion products to the fresh charge by mixing with said products regulated amounts of relatively cool inert gases.

4. A process of reducing oxide ores which comprises indirectly heating a mixture of ore and fuel to a temperature sufficient to simultaneously carbonize the coal and effect at least partial reduction of the ore; in continuously passing the thus-treated charge to an independent smelting zone and heating directly by combustion of carbon thereof to reduce the metallic constituents to a fused condition; and withdrawing the gaseous products from the smelting zone and utilizing them in simultaneously preheating air introduced to the smelting zone and a fresh ore charge in the reducing zone.

5. A process of reducing the smelting ores as a continuous operation which comprises subjecting a slowly moving ore-fuel charge to a reducing temperature out of contact with the air; leading the reduced charge without a substantial drop in temperature to an independent smelting zone and smelting under the influence of a preheated air blast; and withdrawing combustible gases from the smelting zone and burning them to preheat air being led to the smelting zone.

6. A process of reducing and smelting ores as a continuous operation which comprises passing an ore-fuel charge over a plurality of heated members disposed in the path thereof through a reducing zone; supplying heat to said members in sufficient amount to bring about reduction of the ore; leading the reduced charge to an independent smelting zone before a substantial drop in its temperature and smelting under the influence of heat from the combustion of air and residual fuel contained in the charge; withdrawing the combustible gases evolved in the smelting zone and utilizing them in heating the members disposed in the reducing zone.

7. A process of reducing and smelting ores as a continuous operation which comprises passing an ore-fuel charge over a plurality of heated members disposed in the path thereof through a reducing zone; supplying heat to said members in sufficient amount to bring about reduction of the ore; leading the reduced charge to a smelting zone and smelting under the influence of heat from the combustion of air and residual fuel contained in the charge; withdrawing the combustible gases evolved in the smelting zone and utilizing them in heating the members disposed in the reducing zone; and controlling the transfer of heat from said members to the ore-fuel charge by recirculating relatively cool air in heat-absorbing relation with said members out of contact with the ore-fuel charge.

8. A process of reducing and smelting ores as a continuous operation which comprises passing an ore-fuel charge over a plurality of heated members disposed in the path thereof through a reducing zone; supplying heat to said members in sufficient amount to bring about reduction of the ore; leading the reduced charge to a smelting zone and smelting under the influence of heat from the combustion of air and residual fuel contained in the charge; withdrawing the combustible gases evolved in the smelting zone and utilizing them in heating the members disposed in the reducing zone; and controlling the transfer of heat from said gases to said members by mixing with said gases regulated amounts of relatively cool inert gases whereby the temperature in the reducing zone is maintained at a predetermined degree.

9. A process of reducing oxide ores which comprises subjecting a mixture of ore and coal to controlled heat sufficient to produce substantially complete devolatilization of the coal and at least partial reduction of the ore but below the sintering or agglomerating temperature of the reduced metal; in continuously fusing the reduced metal in an independent smelting zone under the influence of the heat of combustion of the devolatilized carbon in air; and withdrawing the gaseous products evolved in the fusion zone out of contact with the materials in the devolatilizing zone.

10. A process of reducing oxide ores which comprises leading a mixture of ore and coal through a zone of gradually increasing heat, the temperature and the rate of travel of the mixture being so controlled as to produce substantially complete devolatilization of the coal and at least partial reduction of the ore; in continuously leading the mixture to a smelting zone before any substantial reduction in its temperature and fusing the reduced metal under the influence of the heat of combustion of the devolatilized carbon in air; and withdrawing the gaseous products evolved in the smelting zone out of contact with the materials in the devolatilizing zone.

11. A process for reducing and smelting ores, comprising passing a mixed ore and fuel charge through a reducing zone, in supplying sufficient heat to said zone to reduce the ore by an indirect application of heat thereto, in discharging reduced ore continuously into a separate zone and in consuming fuel in said separate zone mixed with the ore to smelt the same, in removing from said separate zone combustible gases in a highly heated condition, in supplying the necessary air to consume the gases, and in utilizing such products of combustion to heat the reducing zone.

12. A process of reducing oxide ores which comprises indirectly heating a mixture of ore and coal in a reduction zone sufficiently to reduce the ore and liberate volatiles from the coal, removing the volatiles, introducing the heated mixture to an independent smelting zone and fusing the same therein by combustion of the devolatilized coal, and withdrawing gaseous products evolved in said smelting zone without contact with the ore and coal mixture in said reduction zone.

13. A process for reducing oxide ores which comprises introducing the ore and solid carbonaceous fuel to a reduction zone, indirectly heating the ore and fuel mixture in said zone sufficiently to at least partially reduce the ore and to remove from the fuel any volatile matter contained therein, introducing the heated and devolatilized mixture to an independent smelting zone and burning the fuel therein to smelt the reduced ore, and withdrawing gaseous products evolved in said smelting zone without contact with the ore and fuel mixture in said reduction zone.

In testimony whereof, I have signed my name to this specification this 7th day of February, 1928.

WALTER E. TRENT.